United States Patent
Schonlau et al.

(10) Patent No.: US 9,534,702 B2
(45) Date of Patent: Jan. 3, 2017

(54) ELECTROHYDRAULIC PILOT CONTROL WITH TWO PRESSURE CONTROL VALVES

(71) Applicant: THOMAS MAGNETE GmbH, Herdorf (DE)

(72) Inventors: Jürgen Schonlau, Daaden (DE); Jens Krallmann, Niederfischbach (DE); Harald Geis, Mömbris (DE); Marc Leinweber, Neunkirchen (DE); Thomas Zastrau, Siegen (DE); René Schulz, Burbach (DE)

(73) Assignee: Thomas Magnete GmbH, Herdorf (DE)

( * ) Notice: Subject to any disclaimer, the term of this patent is extended or adjusted under 35 U.S.C. 154(b) by 187 days.

(21) Appl. No.: 14/350,841

(22) PCT Filed: Oct. 9, 2012

(86) PCT No.: PCT/EP2012/004216
§ 371 (c)(1),
(2) Date: Aug. 4, 2014

(87) PCT Pub. No.: WO2013/053458
PCT Pub. Date: Apr. 18, 2013

(65) Prior Publication Data
US 2014/0345701 A1    Nov. 27, 2014

(30) Foreign Application Priority Data

Oct. 14, 2011   (DE) .................. 10 2011 116 176

(51) Int. Cl.
*F16K 31/08*   (2006.01)
*F16K 27/00*   (2006.01)
(Continued)

(52) U.S. Cl.
CPC ........... *F16K 31/086* (2013.01); *F16K 15/066* (2013.01); *F16K 27/003* (2013.01); *F16K 27/048* (2013.01);
(Continued)

(58) Field of Classification Search
CPC ................ Y10T 137/87855; Y10T 1437/7762; Y10T 137/7764; Y10T 137/0396; F16K 27/003; F16K 31/0613; F16K 27/048; F16K 15/066; F16K 31/086
(Continued)

(56) References Cited

U.S. PATENT DOCUMENTS 5,887,624 A   3/1999   Taniguchi et al.
6,202,699 B1  3/2001   Meyer et al.
(Continued)

FOREIGN PATENT DOCUMENTS

CN    1375641 A     10/2002
CN    101688621 A    3/2010
(Continued)

OTHER PUBLICATIONS

International Preliminary Report on Patentability and Written Opinion mailed Apr. 15, 2014 for PCT/EP2012/004216,ISA/EP,Rijswijk, NL.
(Continued)

*Primary Examiner* — Michael R Reid
(74) *Attorney, Agent, or Firm* — Harness, Dickey & Pierce, P.L.C.

(57) ABSTRACT

Electrohydraulic pilot control means (1) for a hydraulic device which can be a proportional directional valve, an adjusting pump or an adjusting motor, which pilot control means contains two proportionally acting pressure control valves (3) and is provided with a control block (2) which accommodates the hydraulic valve parts (4) in holes and to which the associated proportional magnets are flange-connected, wherein the proportional magnets have a common electrical plug connection (5) and wherein the two proportional magnets (3) are joined to form an assembly by being encapsulated with plastic, the said assembly being fastened (Continued)

to the control block (2) and, in this case, being precisely oriented relative to the valve components (4), which are accommodated in the control block, by means of positioning aids which act perpendicular to the movement direction of armatures.

6 Claims, 2 Drawing Sheets

(51) Int. Cl.
    *F16K 31/06* (2006.01)
    *F16K 27/04* (2006.01)
    *F16K 15/06* (2006.01)

(52) U.S. Cl.
    CPC ...... *F16K 31/0613* (2013.01); *Y10T 137/0396* (2015.04); *Y10T 137/7762* (2015.04); *Y10T 137/7764* (2015.04)

(58) Field of Classification Search
    USPC ............. 137/884, 488, 489, 14; 251/129.15; 439/606; 335/278; 303/119.2, 119.3
    See application file for complete search history.

(56) References Cited

U.S. PATENT DOCUMENTS

| | | | |
|---|---|---|---|
| 6,220,300 B1 * | 4/2001 | Schudt | F16H 61/0009 137/884 |
| 6,640,834 B1 * | 11/2003 | Hamkins | F16K 31/0613 251/129.1 |
| 6,837,269 B2 | 1/2005 | Reinelt et al. | |
| 7,878,481 B2 * | 2/2011 | Kallfass | E02F 9/226 137/487.5 |
| 7,967,028 B2 | 6/2011 | Jinno et al. | |
| 2009/0140190 A1 | 6/2009 | Jinno et al. | |
| 2011/0215271 A1 * | 9/2011 | Voss | B60T 8/363 251/129.15 |

FOREIGN PATENT DOCUMENTS

| | | |
|---|---|---|
| CN | 104011442 A | 8/2014 |
| DE | 9115061 U1 | 4/1992 |
| DE | 19681076 C2 | 7/2000 |
| DE | 102008012692 A1 | 9/2008 |
| EP | 0939259 A2 | 9/1999 |
| WO | WO-2013053458 A1 | 4/2013 |

OTHER PUBLICATIONS

International Search Report (in German and English) for PCT/EP2012/004216, ISA/EP, Rijswijk, NL, mailed Jan. 23, 2013.
First Office Action mailed May 11, 2016 for Chinese Patent Application No. 201280049614.8.
Office Action for German Patent Application 102011116176.0 dated Oct. 18, 2012.
International (German) Search Report and Written Opinion dated Jan. 23, 2013 for PCT/EP2012/004216.
International Preliminary Report on Patentability dated Oct. 9, 2012 for PCT/EP3012/004216.

* cited by examiner

ELECTROHYDRAULIC PILOT CONTROL WITH TWO PRESSURE CONTROL VALVES

CROSS-REFERENCE TO RELATED APPLICATIONS

This application is a 371 U.S. National Stage of International Application No. PCT/EP2012/004216, filed Oct. 9, 2012, which claims priority to German Patent Application No. 102011116176.0, filed Oct. 14, 2011. The disclosures of the above applications are incorporated herein by reference.

FIELD

The subject matter of the disclosure is an electrohydraulic pilot control with two pressure control valves. In this case, the hydraulically acting valve components are accommodated in a control block to which the assembly of magnets is also fastened.

BACKGROUND

This section provides background information related to the present disclosure which is not necessarily prior art.

Electrohydraulic pilot control for valves, adjusting pumps and adjusting motors are known and widespread; electrohydraulic pilot control with two or more pressure control valves which set the adjusting pressures by which the appliance which is to be adjusted is adjusted out of a central position against strong return springs are also known. Utility model DE9115061U1 may be cited here as an example.

In the known electrohydraulic pilot control, the pressure control valves are usually fitted at different points, often opposite one another, on the appliance which is to be adjusted.

It is also known, for example from DE9115061U1, to supply electric power to the coils of the two magnets of pilot control valves by a common plug.

Encapsulating the magnets of a pressure control valve with plastic and, in the process, also producing parts of the plug from the same plastic is widespread.

It is also known, for example from patent application DE102008012692, to combine magnets or solenoid valves to form an assembly and, in the process, to use components comprehensively.

Two forms of guiding the magnetic flux from the pole disc to the magnet cone are known; the first uses a cylindrical component which encases the magnet coil, and the second uses a bow-shaped metal sheet which forms the pole disc, the axial return path and the conical disc.

A widespread form of fitting the pressure control valves to the appliance which is to be adjusted makes provision for connecting the hydraulically acting valve components to the magnets in an interlocking manner to form an assembly, for inserting a portion of this assembly into a control block, and for screwing the remaining portion to the control block using two screws.

The known form of fitting creates considerable mounting costs, risks and expenditure on testing for the entire appliance since testing of the valve alone cannot reveal all the potential faults.

SUMMARY

This section provides a general summary of the disclosure, and is not a comprehensive disclosure of its full scope or all of its features.

The object of the disclosure is to save costs by jointly encapsulating and mounting the magnets and also by jointly testing the installed pressure control valves, and designing this model such that the pressure control valves have a good degree of proportionality between the coil current and the control pressure and a low hysteresis.

According to the disclosure, the two proportional magnets are joined by being encapsulated with plastic to form an assembly. This assembly is fastened to the control block using a flange. The hydraulically acting valve components are accommodated in the control block. The assembly of the proportional magnets is precisely oriented on the control block by means of positioning means which act perpendicular to the movement direction of the magnet armature and the valve slide.

These positioning means can be projections of the valve sleeves beyond the control block which are accommodated in the magnet cones by cavities which are matched to the said projections or projections of the magnet cones into the control block which project into the receiving holes for the magnet sleeves and rest in the holes.

The positioning means precisely orient the magnet assembly in relation to the valve components perpendicular to the movement direction of the armature.

Precise orientation of this kind is required if very small transverse forces are intended to be exerted on the valve slide since a lateral offset in the case of orientation results in a tilting moment, and this tilting moment generates a transverse force. The transverse forces are undesirable because they cause friction and consequently hysteresis on the valve.

In one advantageous development of the disclosure, the two magnets are equipped with in each case one bow-shaped metal sheet which guides the magnetic flux, and have a common flange for fastening to the control block, wherein the flange is composed mainly of plastic, is produced in an injection-moulding process and is reinforced by extensions of the bow-shaped metal sheets.

In a further development of the disclosure, the proportional magnets have pressure tubes for mounting the magnet armature, the said pressure tubes each being welded to the cone of the proportional magnets. In this case, the magnet armature is mounted either directly in the pressure tubes or indirectly by bearing bushes which, for their part, are mounted in the pressure tubes.

In the case of the electrohydraulic pilot control according to the disclosure, either the valve sleeves of the pressure control valves are inserted into the control block or the pressure control valves do not have any valve sleeves, and the control block takes over the functions of the valve sleeves for guiding the liquid, and the valve slides are mounted in a displaceable manner directly in the control block.

In both embodiments, the valves are tested when the valves form an assembly with the control block, so that all the possible problems which are associated with the orientation, the mounting and the alignment of the valve components can be identified in the test.

In a further advantageous development of the disclosure, the control block accommodates not only the two pressure control valves, but also one of the two return springs of the adjustment system if the adjustment system has two return springs. If the adjustment system has just one return spring which is active in both deflections out of the central position, this one return spring is accommodated by the return block. Therefore, the valve system with the spring can be tested without the appliance which is to be adjusted having to be mounted beforehand. Since the return spring always remains in the pilot control, manufacturing tolerances of the spring prestress or spring stiffness in the electronics actuator, which is associated with this pilot control, can be compensated for.

The disclosure can likewise advantageously be extended by a pressure reduction valve for supplying pressure to the pressure control valves from the high-pressure connection of the appliance which is to be adjusted being installed in the control block. An advantage in respect of testing the pilot control system results in this case too; it being possible for the said pilot control system to be tested together with the pressure reduction valve.

The described disclosure allows for an adjustment system to be produced in a particularly cost-effective yet highly accurate manner, it also being possible to test the said adjustment system without first mounting it on the appliance which is to be adjusted.

Adjustment systems of the described type are used for pilot control of relatively large proportional directional valves, of hydraulic adjusting pumps and of hydraulic adjusting motors which are used, for example, in self-propelled working machines.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
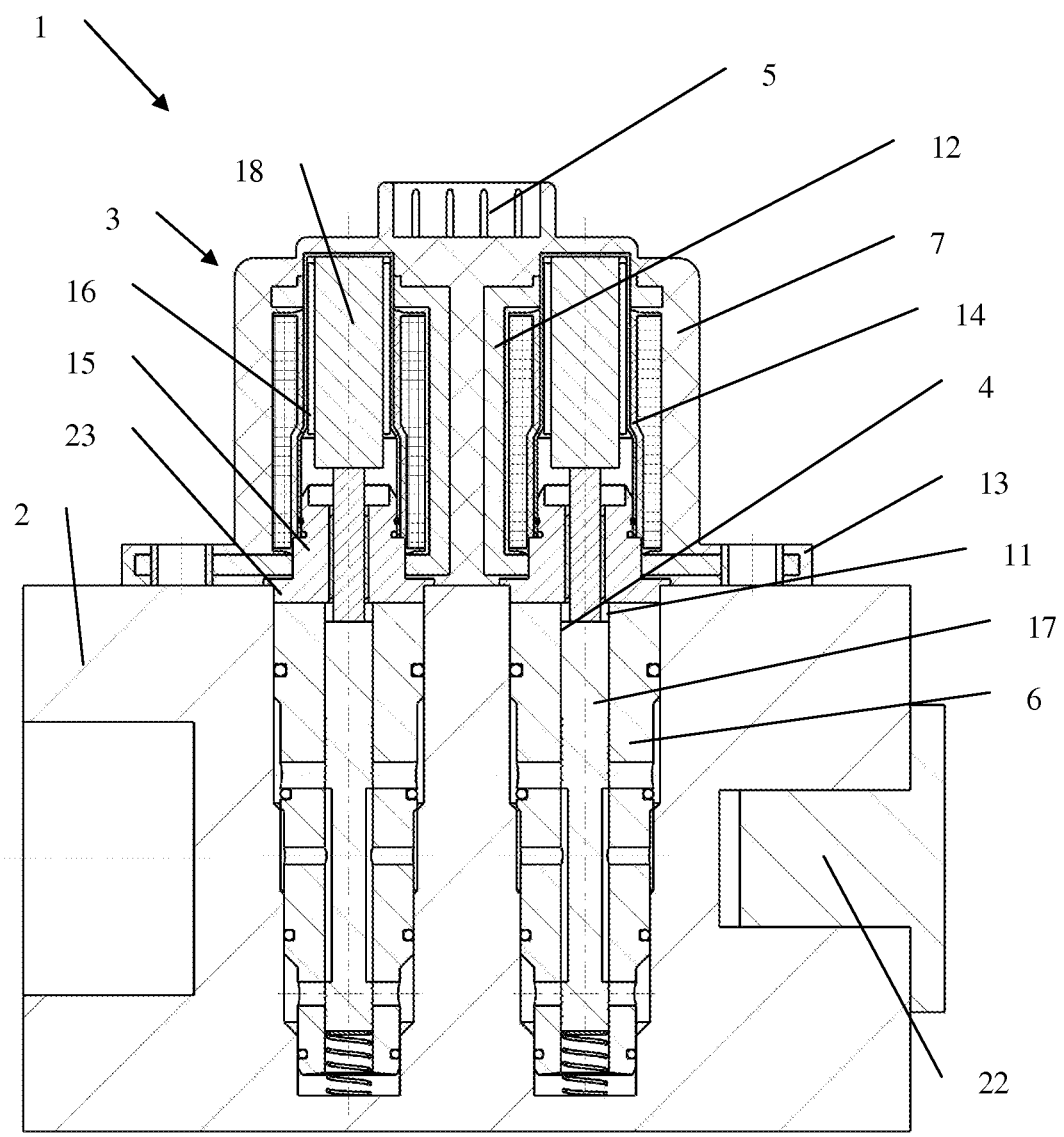
FIG. 1 shows a control block with two pressure control valves, a pressure reduction valve and a return spring, having an interface between the magnet assembly and the control block.

Exemplary embodiment: FIG. 1 shows an electrohydraulic pilot control 1 which contains two proportionally acting pressure control valves, the proportional magnets 3 of the said pressure control valves being provided with a common encapsulation 7 which is composed of plastic. The hydraulically acting valve components 4 are inserted into a control block 2 and the proportional magnets 3 are fastened to this control block 2 by a flange 13. The position of the proportional magnets 3 is secured by the flange 13 and the flange-connection area of the control block 2 in the movement direction of the magnet armature 18; the position of the proportional magnets is secured by projections 23 of the magnet cones 15, which are surrounded by the receiving holes 11 for the valve sleeves 6 in the control block 2, perpendicular to the movement direction.

The proportional magnets 3 each have a bow-shaped metal sheet for magnetic flux guidance 12; the two metal sheets are extended into the flange 13 in order to reinforce the flange 13. In each case, one pressure tube 14, which mounts the magnet armature 18 indirectly by the bearing bush 16, serves to guide the magnet armature 18.

The magnet armature 18 operates the valve slide 17, which is mounted in the valve sleeve 6, and, together with the valve slide 17, fulfils the valve function.

The control block 2 also accommodates the return spring which returns the hydraulic appliance, which is adjusted by the electrohydraulic pilot control 1, to the central position and a directionally proportional force counters the actuating pressure of the pressure control valves.

The two pressure control valves are supplied with pressurized liquid by the hydraulic appliance, which is to be adjusted, by the pressure reduction valve 22. The pressure reduction valve 22 is also installed in the control block 2.

Figure 2:
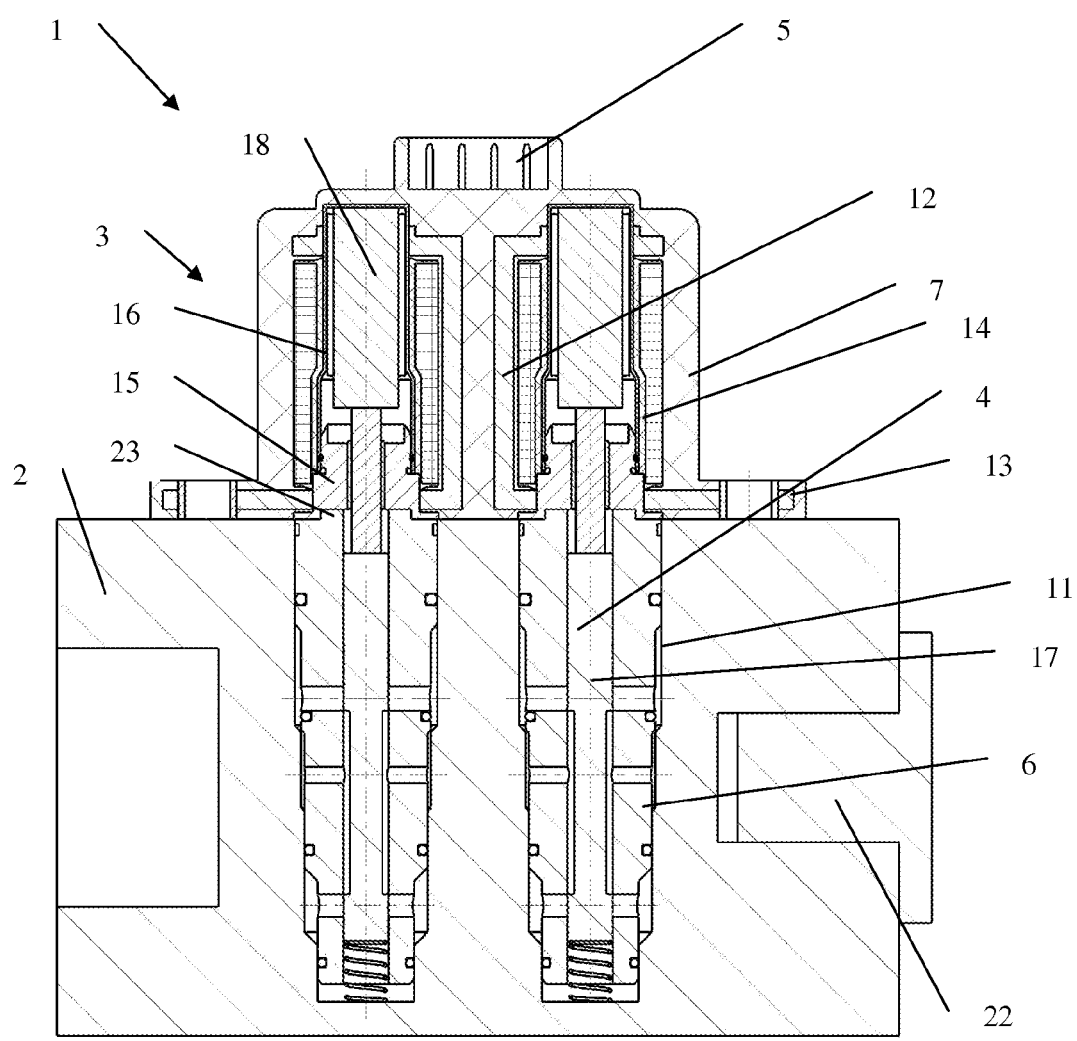
FIG. 2 shows the interface between the magnet assembly and the control block.

As an alternative to the manner of securing the proportional magnets shown in FIG. 1, FIG. 2 shows a manner of securing the proportional magnets by projections 23 of the valve sleeves 6 out of the control block 2 and cavities, which match the said projections, in the magnet cones 15.

Exemplary Series Test Method:

In order to test the electrohydraulic pilot control during the course of series production, all the components of the pilot control, specifically the valve components 4, the proportional magnets 3, the return spring and the pressure reduction valve 22, are mounted in or on the control block 2. In this state, the control block is placed in a test stand and the hydraulic lines for the inflow and the outflow of the pressurized liquid are connected. An electrical actuator is connected to the electrical plug connection 5 by a cable. Furthermore, pressure sensors are connected to the output lines of the pressure control valves. In this state, the pressure control valves are tested, for example, characteristic curves of the pressure are recorded as a function of the electric currents. Independently of this, the force/movement characteristic curve of the return spring is determined with suitable measuring appliances. The return spring always stays given relevant pilot control.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SYMBOLS

1. Pilot control
2. Control block
3. Proportional magnet
4. Valve components
5. Electrical plug connection
6. Valve sleeve
7. Encapsulation of the proportional magnets
11. Receiving hole
12. Metal sheet for magnetic flux guidance
13. Flange
14. Pressure tube
15. Magnet cone
16. Bearing bush
17. Valve slide
18. Magnet armature
22. Pressure reduction valve
23. Projection

The invention claimed is:

1. An electrohydraulic pilot control for a hydraulic device, the pilot control comprising:
   two proportionally acting pressure control valves; and
   a control block which accommodates a group of hydraulic valve components in holes and to which two proportional magnets are flange-connected;
   wherein the two proportional magnets are joined to form an assembly by being encapsulated with plastic and have a common housing of an electrical plug connection, which housing is cohesively connected to the proportional magnets, wherein the assembly of the proportional magnets is fastened to the control block and, is oriented relative to the valve components, which are accommodated in the control block, by a positioning means for acting perpendicular to the movement direction of magnet armatures;
   wherein the proportional magnets are both equipped with in each case one bow-shaped metal sheet which guides magnetic flux, and have a common flange for fastening to the control block, wherein the flange is reinforced by extensions of the metal sheets;
   wherein the positioning means provides relative lateral positioning of the assembly of the proportional magnets to the valve components by use of projections extending from valve sleeves in the control block that engage matching cavities defined in magnet cones of the proportional magnets; or
   wherein the positioning means provides relative lateral positioning of the assembly of the proportional magnets to the valve components by use of projections extending from the magnet cones that engage in receiving holes defined in the valve sleeves.

2. The electrohydraulic pilot control according to claim 1, wherein the proportional magnets have pressure tubes for mounting the magnet armature, the pressure tubes each being welded to the cone of the proportional magnets, wherein the magnet armature is mounted in the pressure tubes.

3. The electrohydraulic pilot control according to claim 1, wherein the valve sleeves of the proportionally acting pressure control valves are inserted into the control block.

4. The electrohydraulic pilot control according to claim 1, wherein the control block additionally contains a pressure reduction valve for providing supply pressure for the pressure control valves.

5. A method for testing the electrohydraulic pilot control according to claim 1, wherein the valve components are fitted in the control block, the magnet assembly comprising the two pressure control valves is flange-connected to the control block, and the operation of the two pressure control valves are tested in this state during the course of series production.

6. The method for testing the electrohydraulic pilot control according to claim 5, wherein the two pressure control valves in the control block are tested together with a pressure reduction valve.

* * * * *